US006412158B1

(12) United States Patent
Moore

(10) Patent No.: US 6,412,158 B1
(45) Date of Patent: Jul. 2, 2002

(54) COMBINED TOOLS FOR REMOVING AND INSTALLING VALVE KEEPERS IN AN INTERNAL COMBUSTION ENGINE

(76) Inventor: Randall C. Moore, 23 Sorrel La., Rolling Hills Estates, CA (US) 90274

(*) Notice: Subject to any disclaimer, the term of this patent is extended or adjusted under 35 U.S.C. 154(b) by 0 days.

(21) Appl. No.: 09/934,918

(22) Filed: Aug. 22, 2001

Related U.S. Application Data

(60) Provisional application No. 60/226,941, filed on Aug. 22, 2000.

(51) Int. Cl.[7] .............................................. B23P 19/04

(52) U.S. Cl. ............................ 29/249; 29/214; 29/252; 269/3; 269/6

(58) Field of Search .......................... 29/249, 252, 214, 29/213.1, 888.42, 402.08, 426.5, 221.6, 255, 240, 281.1, 281.4, 282, 404, 890.121, 890.124; 269/6, 3, 43, 45

(56) References Cited

U.S. PATENT DOCUMENTS 3,315,339 A * 4/1967 Young ........................ 29/249
5,241,747 A * 9/1993 Harmand ................. 29/888.42
6,219,896 B1 * 4/2001 Levy et al. ................... 29/249
6,302,386 B1 * 10/2001 Fuller et al. ................... 269/6

* cited by examiner

*Primary Examiner*—Joseph J. Hail, III
*Assistant Examiner*—Lee Wilson
(74) *Attorney, Agent, or Firm*—Monty Koslover

(57) ABSTRACT

A combination tool system, comprising a hand-held, valve keeper remove/install tool and an engine head clamping support device. Both the hand-held tool and the clamping support device are used together, and include special extraction and installation mechanisms and support parts that enable the easy and safe removal and installation of the segmental valve keepers of an internal combustion engine having cylinder heads with four valves per cylinder, and having recessed valve springs. Removal or installation of a segmental valve keeper typically takes less than a minute. Using the invention tools together avoids the usual risks of causing damage to valves and possible loss of parts. The tools are efficient to use and inexpensive.

7 Claims, 11 Drawing Sheets

COMBINED TOOLS FOR REMOVING AND INSTALLING VALVE KEEPERS IN AN INTERNAL COMBUSTION ENGINE

This application claims the benefit of provisional application No. 60/226,944, filed Aug. 22, 2000.

BACKGROUND OF THE INVENTION

1. Field of the Invention

This invention relates to tools for automobile engine repair and servicing, and more particularly to tools designed for removing and installing the segmental valve keepers in an internal combustion engine.

2. Background

The internal combustion engine, particularly that used for automobiles, is well known in the art. The engine employs dual overhead camshafts to operate cylinder intake and exhaust valves. Each valve is held in place by a spring, a retainer and a segmental keeper, and operates reciprocally in a sleeve pressed into the engine head, called a valve guide.

The valve guide protrudes slightly above the top of the head and includes a valve seal pressed into its' top to prevent oil leakage past the guide and into the combustion chamber. The spring which surrounds the valve stem, sits atop the head for engines with two valves per cylinder, and is held in place under compression by a retainer and a segmental valve keeper.

If it becomes necessary to repair or replace a valve spring assembly or any part of the assembly, it is first required to remove the segmental valve keeper from the particular valve. After replacement is completed, it is necessary to re-install the segmental keeper. This requires a special, hand-held tool that is designed for extracting or installing a segmental valve keeper at the top of a valve. In addition, it is necessary to have some device means of holding and firmly supporting the bottom surfaces of the valve stems during removal or installation of the valve keepers to prevent the valve stems from falling and becoming damaged. There are no known devices or equipments presently available for this clamping support function. Until now, removal and installation of valve spring assemblies has been a laborious and time-consuming process, presenting an ongoing challenge to even experienced, skilled technicians. The currently used means of supporting the valve stems, employs C-clamps, various cloths, adaptors, and all manner of jury-rigged brackets to hold the valve stems in place, often with minimal results. These minimal results include the risk of losing the segmental valve keepers, scratching the fine finish of the valves or their bores and dropping the valve stems. A specially designed device or equipment for this clamping support function is obviously needed.

Various hand-held tools have become available in the past few decades to assist in removal and re-installation of valve keepers in automotive engine heads having two valves per cylinder, with the valve springs externally located.

However, all include limitations in usage and drawbacks including possible damage to the assemblies, valves and engine.

An example of an available hand-held tool for mounting and demounting automotive valve assemblies is described in U.S. Pat. No. 3,315,399. The tool is a cylindrical member made of steel, having cavities in both ends that are shaped to fit over the top end of a valve assembly. It is operated by administering a sharp blow to the free end of the tool while it is positioned over a valve spring retainer. This is particularly suitable for engine heads with two valves per cylinder, having large valves and springs where considerable force is needed to compress a valve spring.

The potential for inflicting damage on a valve assembly is considerable in view of the method required to operate the tool, mandating a certain level of skill in its use.

However, the described tool in U.S. Pat. No. 3,315,339 and similar tools are not suited for the current, modern automobile engines because of the tool's size and mode of operation, which is adapted for two valves per cylinder and externally accessible valve springs.

Considerable advances in engine technology have led to additional valves per cylinder to obtain a greater torque band, with a resulting better all-round performance and improved gas mileage. The new engine configuration of four recessed valves per cylinder head, thus makes use of the prior art tools impractical for the removal and installation of valve spring assemblies.

There is therefore a need for a valve keeper removal and installation tool that is specially designed for use with engines having four valves per cylinder head, in combination with a reliable, safe and inexpensive device for holding the valve stems in place while the work is being done.

There is also a need for a means of performing the task of removal and installation of the valve assemblies in a much shorter time than is presently consumed.

SUMMARY OF THE INVENTION

The invention is a combination tool system, comprising a hand-held, valve keeper remove/install tool and an engine head clamping support device that are used together for enabling the easy removal and installation of the segmental valve keepers of an internal combustion engine having cylinder heads with four valves per cylinder, and having recessed valve springs. The hand-held tool comprises a handle member and a separate piston cylinder member which is inserted in the handle end when in use. The piston cylinder includes a mechanism located in one end of the cylinder body for extracting a valve keeper, and a mechanism located in the distal end of the cylinder body for installing a valve keeper. The engine head clamping support device provides means for clamping an engine head securely and safely in place, and includes provision for a soft but firm support of the valve stems during a removal or installation procedure, avoiding the risk of causing damage to valve parts or dropping and losing parts.

A prime invention advantage is that the removal and installation of segmental valve keepers is much faster than is possible with the presently available tools and equipments.

Another advantage is that use of the invention tools does not require special technical skills to avoid possible damage to the valves.

Accordingly it is a principal object of this invention to provide a combination of tools that enable the fast, easy removal and installation of segmental valve keepers of an internal combustion engine, without causing damage to the valves or engine parts.

Another object is to provide a combination of system tools for removal and installation of valve keepers, that is inexpensive.

Further objects and advantages of the invention will be apparent from studying the following portion of the specification, the claims and the attached drawings.

DESCRIPTION OF THE PREFERRED EMBODIMENT

The invention is a combination tool system, combining two separate special tools for enabling the easy removal and installation of the segmental valve keepers of an internal combustion engine having cylinder heads with four valves per cylinder, and having recessed valve springs. One tool is a hand-held, valve keeper remove/install device, and the other is an engine head clamping support which is designed to firmly hold the valve stems in place without damage during the process of removing or installing valve keepers. Both tools must be used together to obtain the benefits of speedy removal and installation of a set of valve keepers while avoiding possible damage to the engine head or valve stems.

Alternatively, the invention system tools, with some modification, may be used for removing and installing valve keepers in engine heads having only two valves per cylinder, where the valve springs are exposed.

Figure 1:
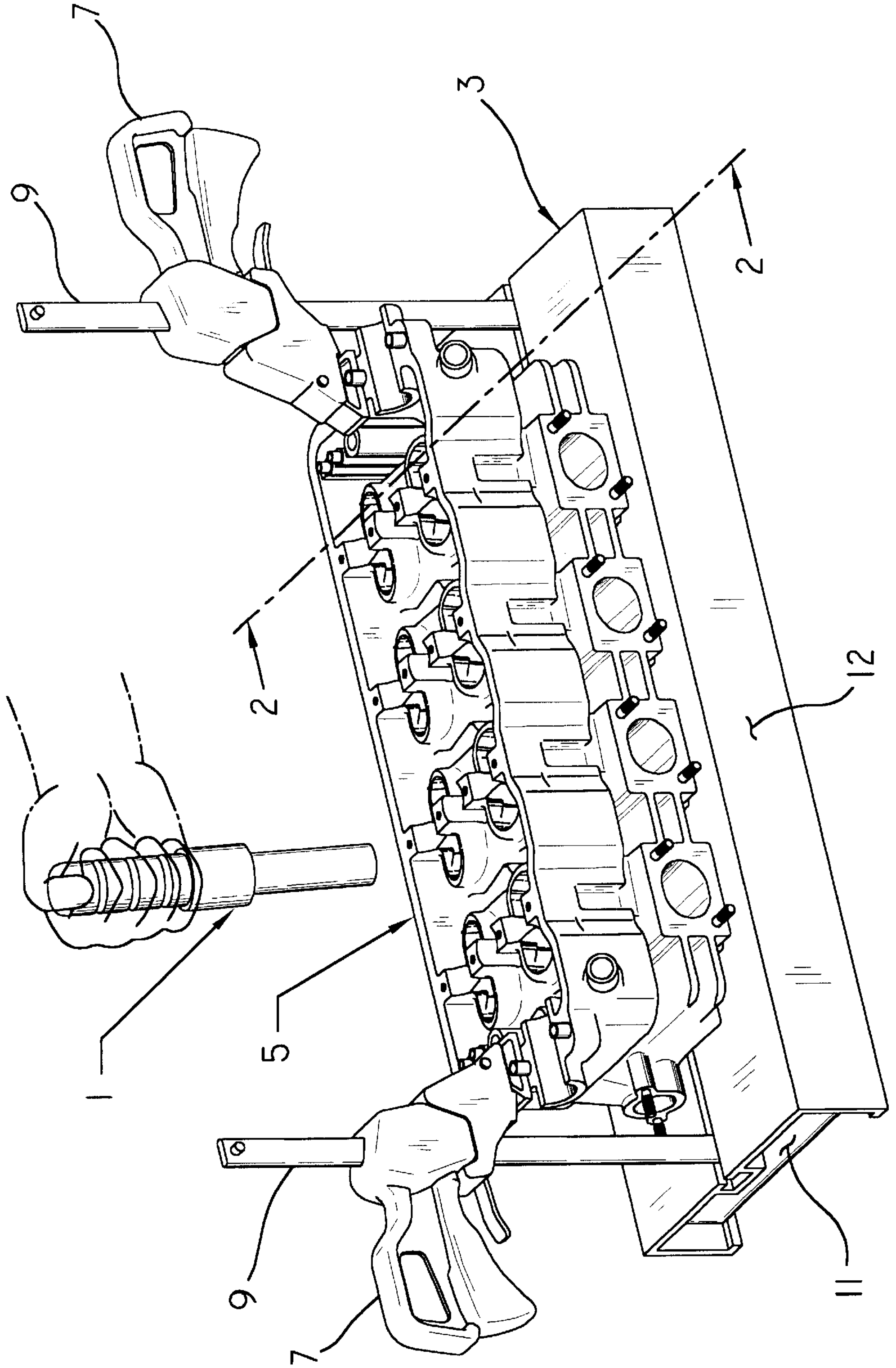
FIG. 1 is a perspective view, showing an engine head mounted on a clamping support device which is one part of the present invention, and made ready for removal or installation of valve keepers, and a user holding a valve keeper removal/installation tool that is the other part of the present invention, ready to remove or install a valve keeper.

Referring particularly to the drawings, there is shown in FIG. 1, an engine head 5 mounted on the invention clamping support 3, ready for removal or installation of valve keepers, and a user holding the invention hand-held valve keeper remove/install tool 1 ready to remove or install a valve keeper. The engine head 5 may be for an engine having from two to eight cylinders or more; all of these sizes can be mounted and secured firmly on the clamping support 3. This is done by simply moving and adjusting the position of the slidable clamp post assemblies 9 which are located at each end of the support base 12. A slidable, padded clamp 7 which incorporates a hand-operated locking grip is mounted on each clamp post assembly 9, and is used to press down firmly on the top of the engine head, holding the head in place as needed.

A removable drawer 11 is located in the support base 12 for use in storage of parts such as removed segmental valve keepers or tool parts, during use of the equipment.

The valve keeper remove/install device 1 is composed of two major parts: a handle and a piston cylinder. The piston cylinder has one end for extracting and removing a valve keeper and its distal end for installing a valve keeper. When in use as shown in FIG. 1, the piston cylinder is mated with the handle, leaving the desired remove or install, end projecting for operation.

Figure 2:
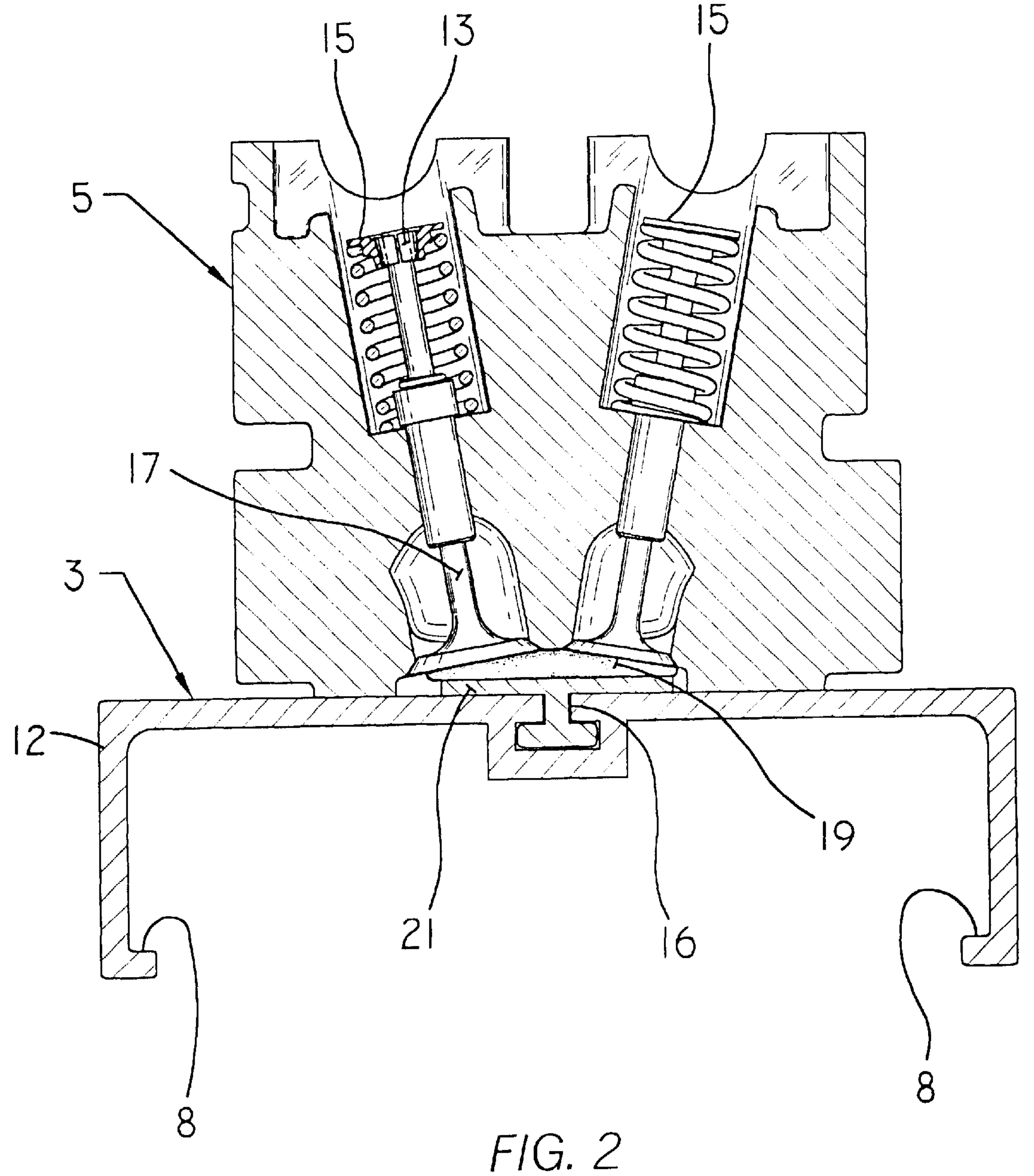
FIG. 2 is a cross-section view of an engine head which is mounted on the base of the invention clamping support device, taken along line 2—2 of FIG. 1 and particularly showing two recessed valve stems supported by a compressible hemi-sphere which is part of a valve stem support, and also indicating the location of the valve keepers on the valve stems.

Refer now to FIG. 2, which is a cross-section view of the engine head 5 mounted on the clamping support 3, taken along line 2—2 of FIG. 1. In this view, two of the four valve assemblies of a given cylinder are shown, with one of the valve assemblies partially cut away to show a segmental valve keeper 13 and spring retainer 15 fastened in position at the top end of a valve stem 17. The bottoms of four valve stems 17 are held firmly by a valve support comprising a hemisphere 19 made of a dense, elastic material that is fastened to a holder 21. This prevents any valve stem 17 from slipping out of the engine head 5 during the valve keeper removal or installation, without causing damage to the finish of the valve stems. Each valve support, one for each engine cell, is inserted using its holder attached rail, in a recessed channeled slot 16 in the top surface of the support base 12.

The support base 12 includes an inwardly protruding lip 8 at the lower end of the two side walls, for support of the sliding drawer 11.

Use of the tools on an engine head set up as shown in FIGS. 1 and 2 is as follows: A user first inserts the piston cylinder portion of the hand-held device 1 in a valve bore until it bears on the top end of a valve assembly. The user then grasps the device 1 handle portion and applies downward pressure on the piston cylinder to compress the valve spring as required to perform the action of releasing or installing a valve keeper. He then releases the pressure and withdraws the hand-held device 1 from the valve bore, the removal or installation time typically taking less than a minute to perform.

The time is short because the manipulating process performed by piston cylinder portion of the tool is precise, and only moderate downward hand pressure is required to compress a valve spring. No handle blows are required. This is possible because the valve springs of four valve head cylinders are smaller and weaker in tension than the springs of two valve head cylinders.

Figure 3:
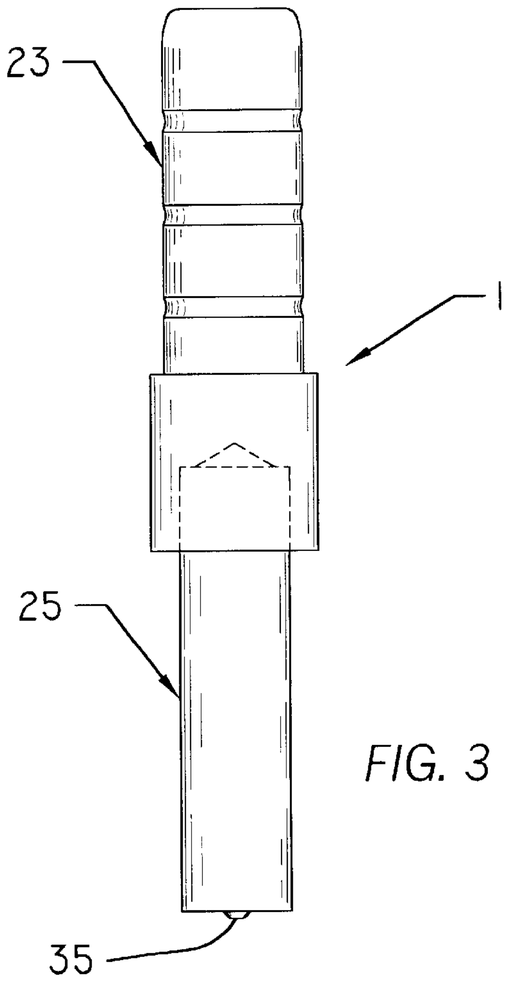
FIG. 3 is a side elevation view of a valve keeper removal/installation tool according to the present invention, showing a piston cylinder inserted in one end of a handle.
Figure 4:
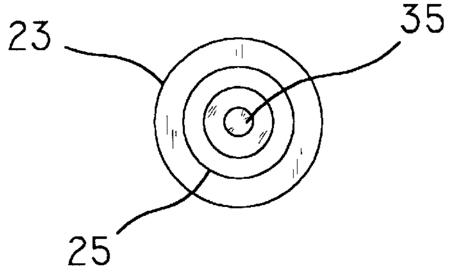
FIG. 4 is a bottom end view of the valve keeper removal/installation tool, showing one end of the piston cylinder.

The composition of the separate tools is now described in detail. Refer now to FIGS. 3, 4, 5 and 6 which show differing aspects of the valve keeper remove/install device 1. FIGS. 3 and 4 are respectively, a side elevation view and an end view of the device 1, which comprises two separate major parts: a cylindrical rigid grip handle 23 and a piston cylinder 25. The handle 23 is open at one end and has an internal axial cavity 27 that is sized to closely fit over the piston cylinder 25, allowing a portion of the piston cylinder 25 to protrude out the handle 23 open end. The two ends of the piston cylinder 25 are designed specifically for different functions. One end designated as the "remove function" end is for extracting and removing a valve keeper from a valve and the other end, designated the "install function" end is for installing a valve keeper. In FIGS. 3 and 4, an end of the installation centering pin 35 is shown protruding from the end of the piston cylinder, indicating that this is the install function end of the cylinder for installing valve keepers.

Figure 5:
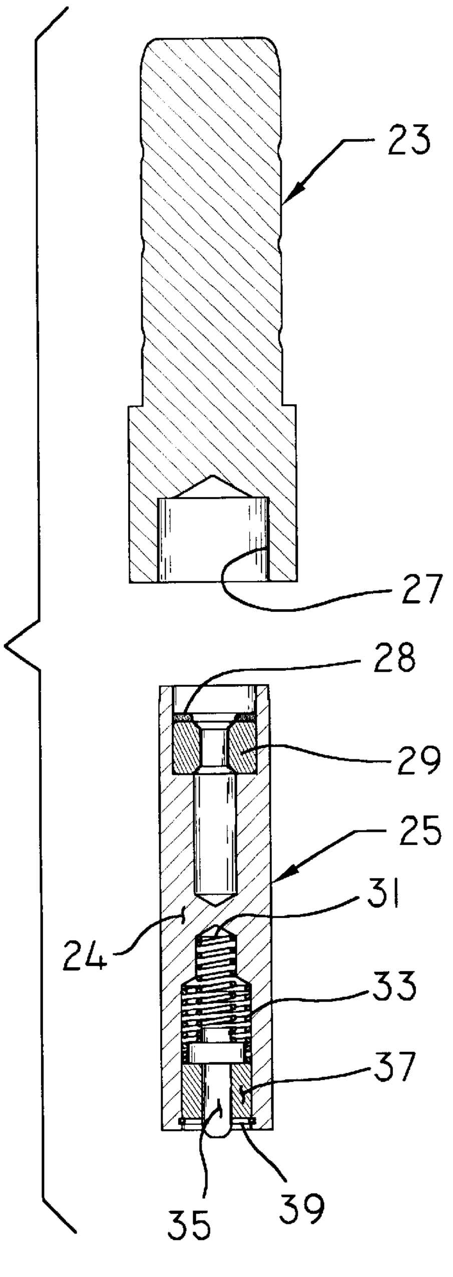
FIG. 5 is a longitudinal cross-section view of the handle and the piston cylinder shown separated, particularly indicating the arrangement of the internal component parts of the piston cylinder.

FIG. 5 is a longitudinal cross-section elevation view of the handle 23 and piston cylinder 25, shown separated. The handle 23 is shown to be solid and having only an axial cavity 27 at one end for mating with the piston cylinder 25. Grooves are cut around the handle circumference to aid hand gripping.

The piston cylinder 25 is an assembly comprising the following parts:

(a) a cylindrical body member 24;

(b) an annular shaped magnet 29 that is fitted in a cavity located in the remove function end of the body member 24;

(c) a split-spring washer 28 that is located over the magnet 29 to retain the magnet;

(d) means for centering the piston cylinder over a valve; including a centering spring 31 that is fitted in the center of a cavity in the install function end of the body member 24, and a centering pin 35 which is fitted axially in the install function end cavity, with the centering spring 31 bearing on the top surface of the pin 35;

(e) a tubular piston member 37 that is fitted under and around the centering pin 35; and (f) a piston spring 33 which fits around the lower portion of the centering spring 31 inside the install function end cavity and spring-loads the piston member 37; and (g) a retaining ring 39 that snaps into a groove in the cavity wall near the lower edge of the body member 24 and retains the piston member 37 in place.

Figure 6:
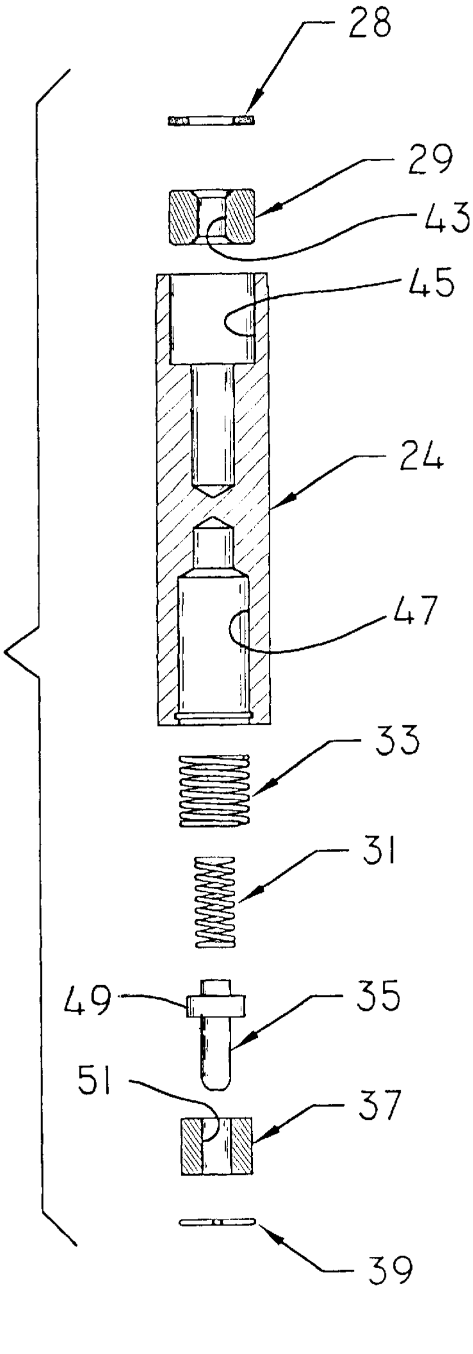
FIG. 6 is an exploded view of the piston cylinder parts.
Figure 7A:
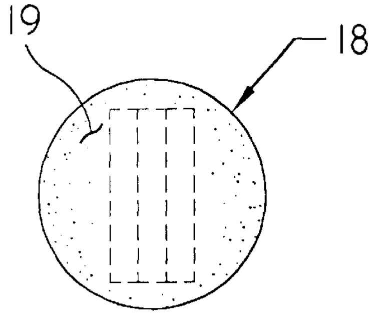
FIGS. 7*a,* 7*b* and 7*c* are respectively, a top view, a side elevation view, and a bottom view of a valve stem support that is part of the invention clamping support device.
Figure 7B:
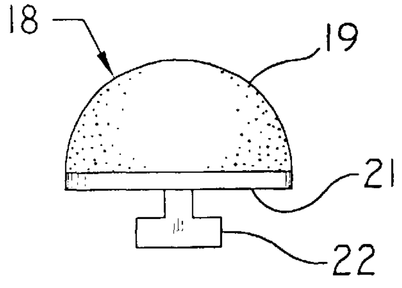
Figure 7C:
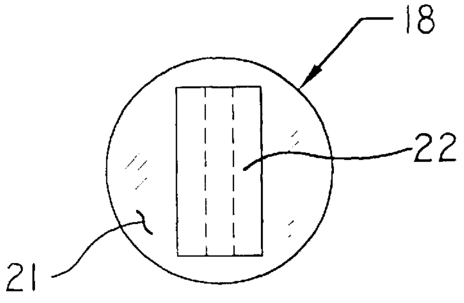

The piston cylinder 25 is shown in exploded view in FIG. 6 which shows the individual parts, some in cross-section, to clarify the parts relationships. The magnet 29 is annular in shape, having an axial through hole 43, and is a commercially available component as is its retaining steel washer 28. The body member 24, which is made of aluminum includes a stepped axial cylindrical cavity 45 in one end, in which the magnet 29 and washer 28 are embedded. The body member distal end includes a second stepped axial cylindrical cavity 47 which is sized and shaped to hold all the components of the install function end in the sequence shown in FIG. 6.

The centering pin 35 includes a circular projecting shelf 49 which is located near the top of the pin for the purpose of providing a surface on which the centering spring bears.

The piston member 37 is annular in shape, having a central through hole 51, while the retaining ring 39 is a standard, commercially available part.

To summarize the main features of the piston cylinder 25, one cylinder end includes an axial cavity and an embedded magnet that is shaped and adapted for fitting axially over the top of a valve spring assembly to bear on and compress the valve spring. This allows the embedded magnet to draw up and remove the segmental keeper. The other cylinder end includes an axial cavity that incorporates an internal, spring-loaded piston and centering pin that are used for installing a segmental keeper as described later in this specification.

Both the handle 23 and the body 24 of the piston cylinder assembly are made from aluminum which is a rigid, strong material and will not damage the surfaces of an engine valve or the recessed bore containing the valve assembly.

Figure 8:
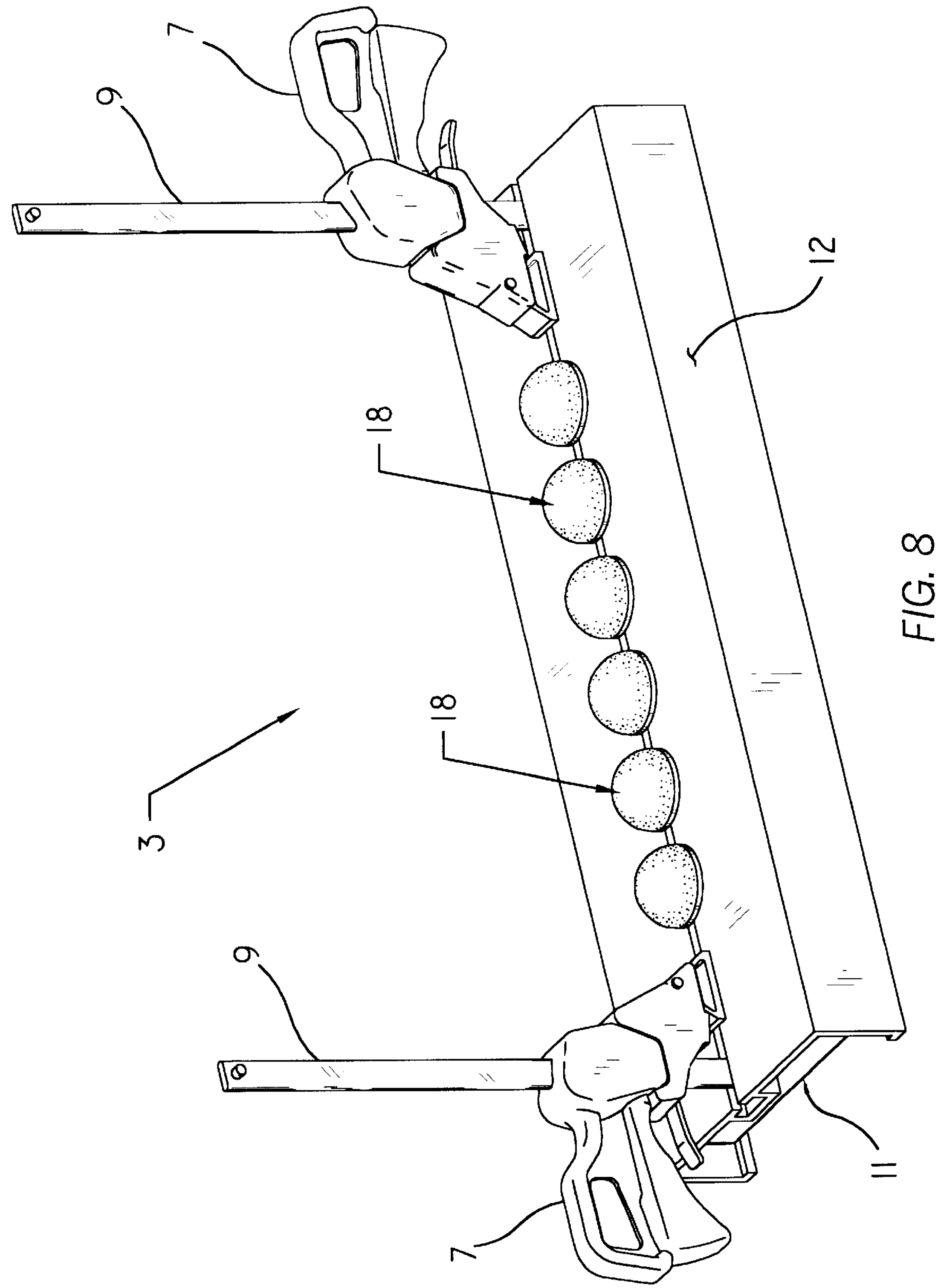
FIG. 8 is a perspective view of an assembled engine head clamping support device for holding valve stems in place, according to the present invention.

Referring now to FIG. 8, there is shown a perspective view of the engine head clamping device 3 according to the present invention. The device 3 comprises a rigid aluminum base 12, two clamp post assemblies 9 with adjustable, padded clamps 7, and a quantity of external valve stem supports 18. Each valve stem support 18 as shown in FIGS, 7*a,* 7*b* and 7*c,* comprises a hemi-sphere shaped compressible pad 19 which is made of a dense, elastic material, and is fastened to a metal disc 21 to a segment of inverted T-section rail 22. The number of valve stem supports 18 that are used is equivalent to the number of engine cylinders, which may be typically six or four. Each valve stem support 18 is inserted using its attached rail, in a recessed channeled groove in the top surface of the support base 12. These are then fixed in a position correlating to the longitudinal location of each cylinder four-valve group, so that the valve supports 18 will be directly under the valves.

Figure 9:
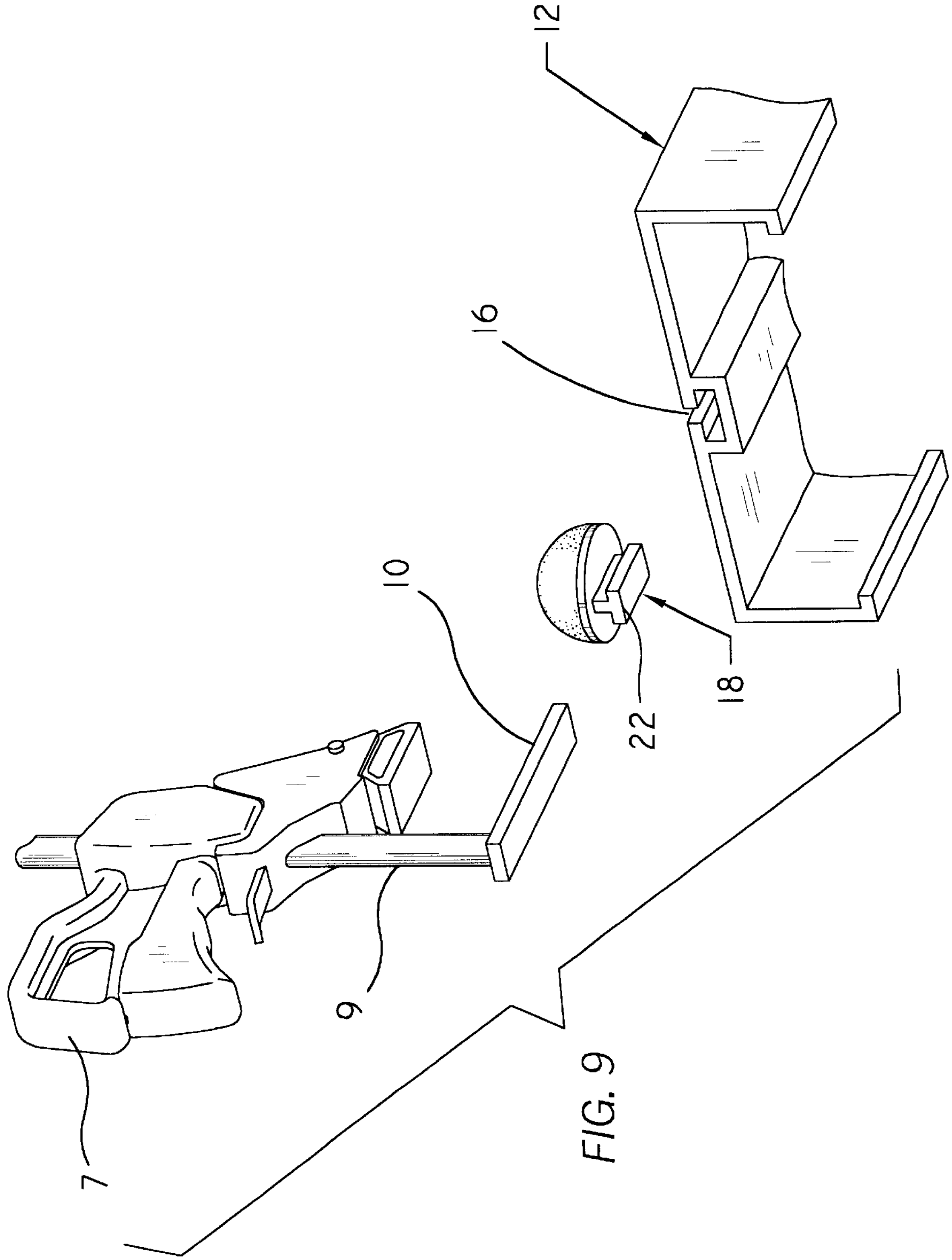
FIG. 9 is a partial exploded view of the invention engine head clamping support device, useful in showing how the valve stem supports and end clamp assemblies are fastened to the device base.

FIG. 9 illustrates how the foot member 10 of a clamp post assembly 9 and the inverted T-section rail 22 of a valve stem support 18, are inserted in a channeled groove 16 in the top of the support base 12 in order to assemble the engine head clamping support 3.

Figure 10:
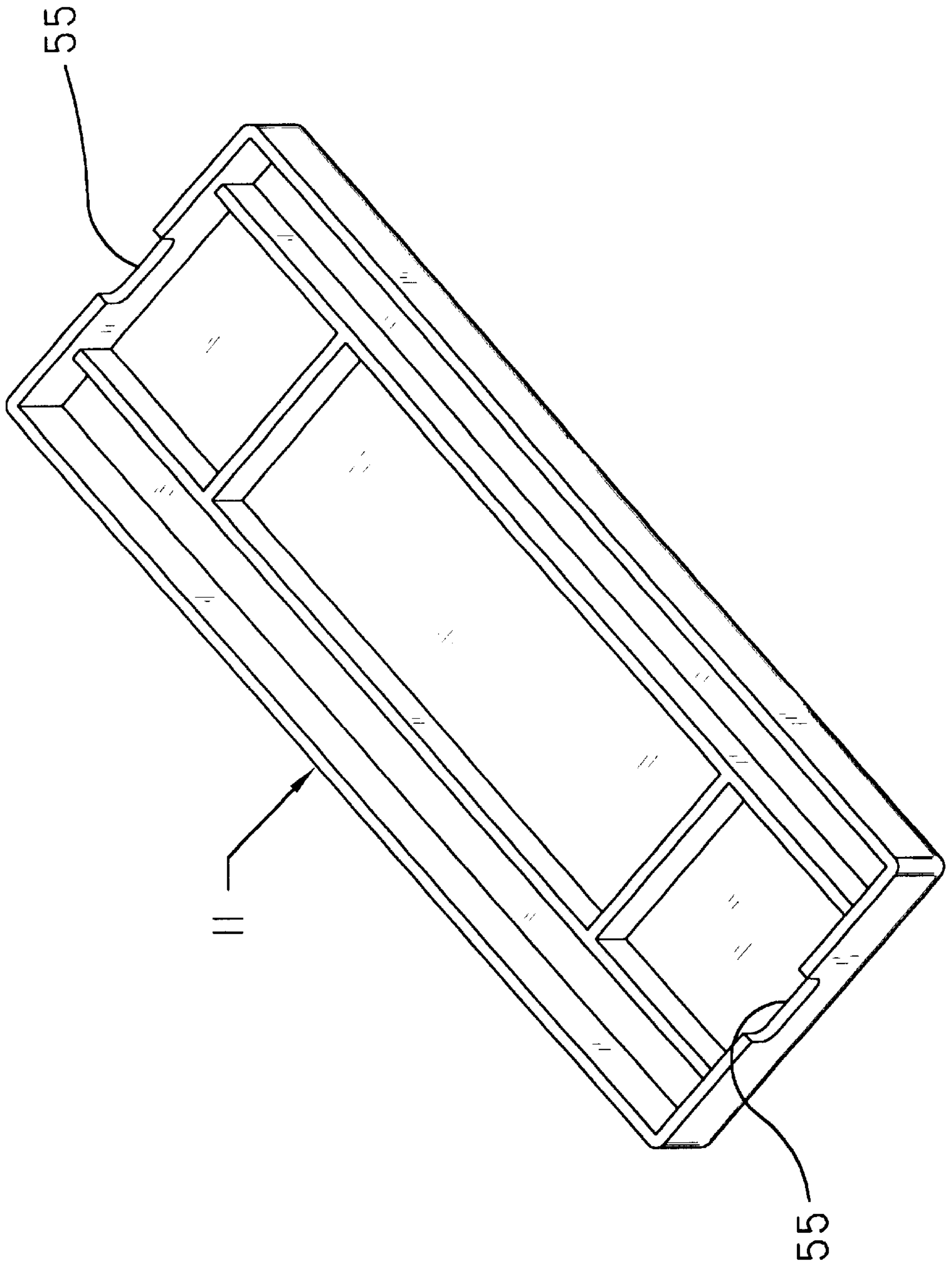
FIG. 10 is a top perspective view of a drawer that fits in the base of the invention engine head clamping support device.

The parts drawer 11 is illustrated in FIG. 10. The drawer is partitioned to contain spare parts such as unused valve stem supports, or to hold removed valve keepers or other valve parts as may be needed during work on an engine head. The top edge of the wall at each end of the drawer 11 is cut out 55 to clear the recessed, groove channel 16 under the top surface of the support base 12, and facilitate storage and sliding removal of the drawer 11 in the support base 12.

After an engine head 3 is placed on top of the support base 12 over the valve stem supports 18, the two clamp post assemblies 9 are pushed into the support base center mounting groove and the padded hand clamps 7 are fastened to the top end edges of the engine head 3 as shown in FIG. 1. The work of removing or installing the valve segmental keepers may then be performed.

Figure 11:
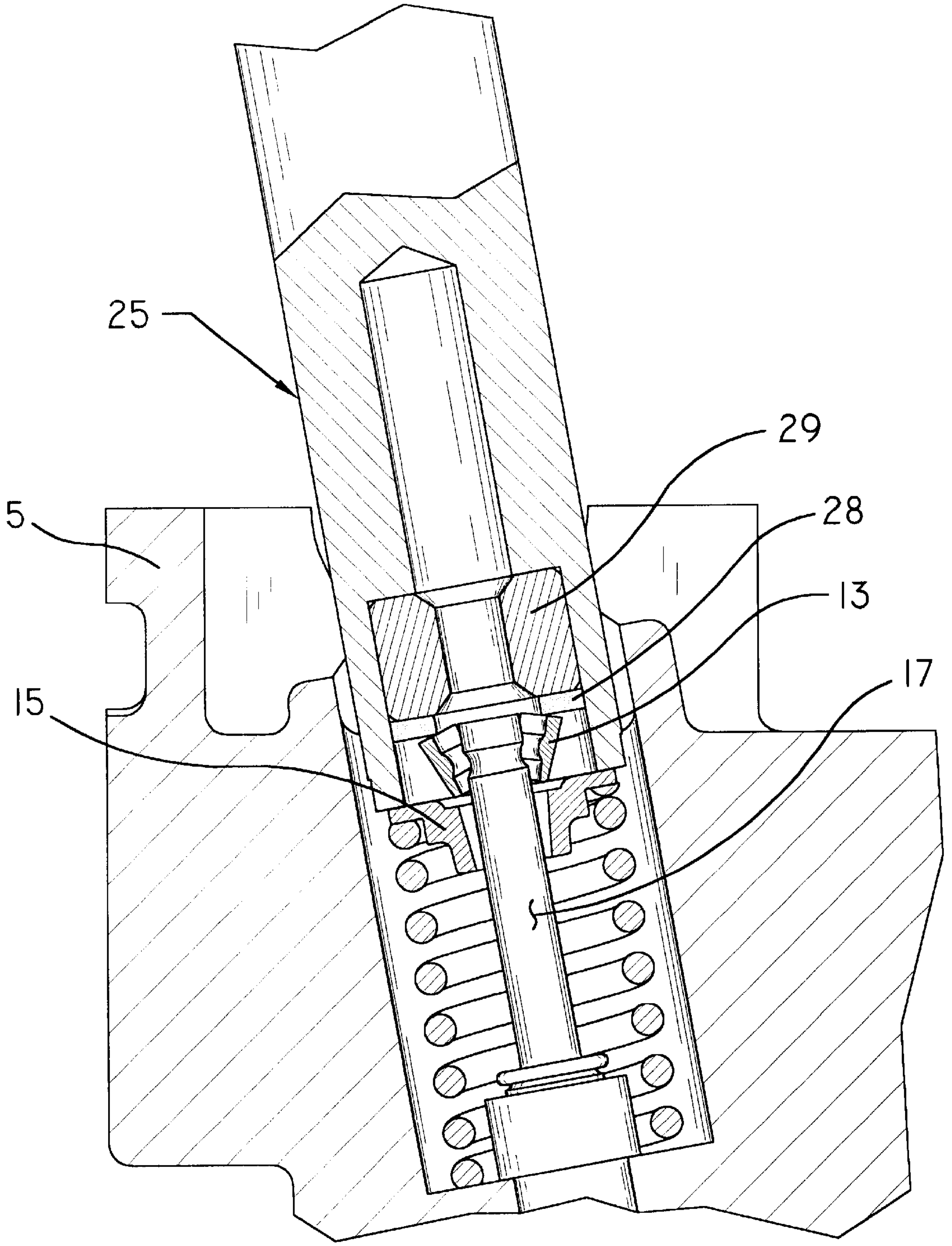
FIG. 11 is a partial cross-section view of the invention device piston cylinder being used to remove a segmental keeper from an engine valve spring assembly, particularly showing the removal end of the piston cylinder in use.
Figure 12:
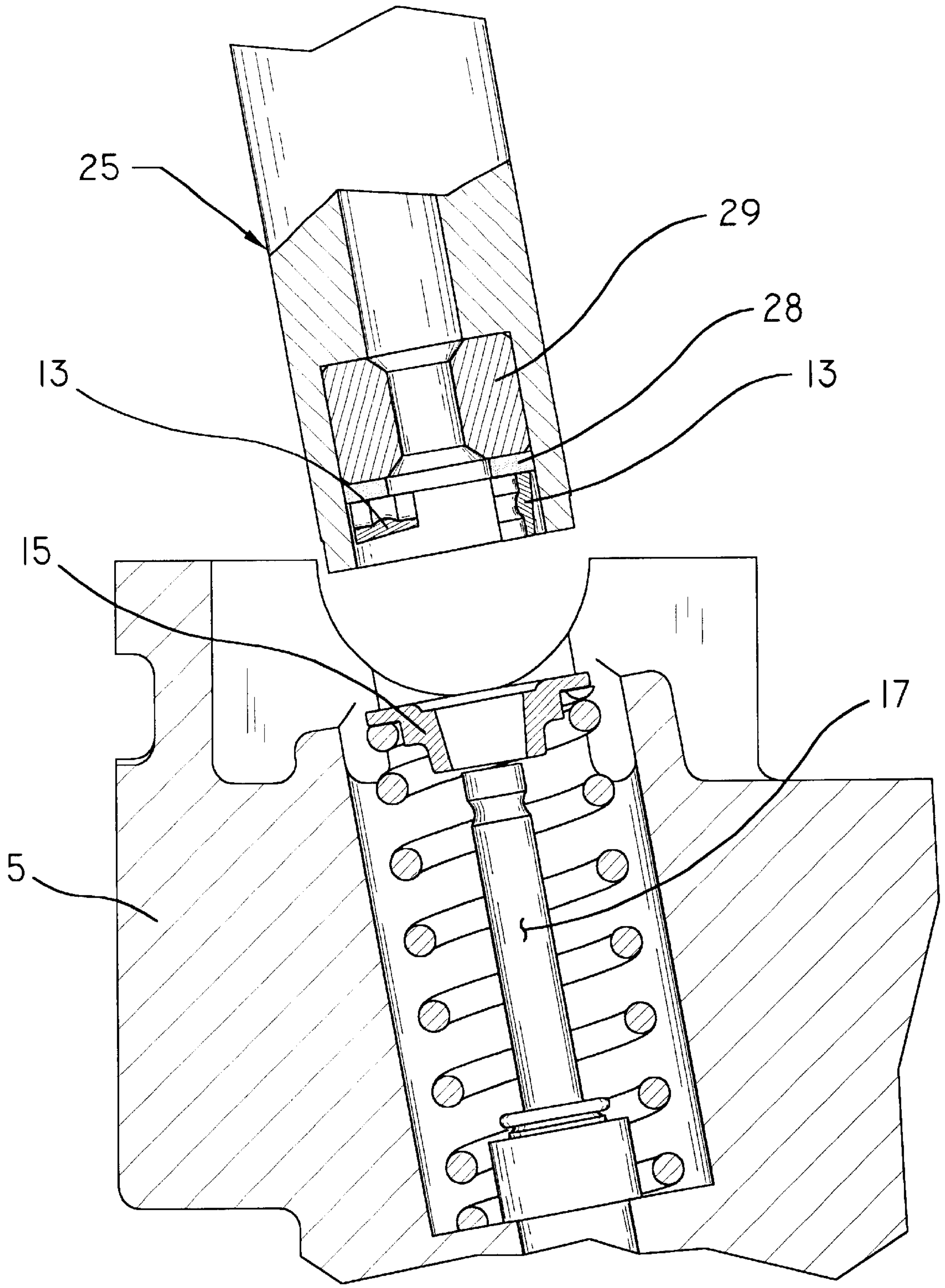
FIG. 12 is a partial cross-section view of the invention piston cylinder and an engine valve spring assembly, showing a removed segmental valve keeper being held by a magnet in the end of the piston cylinder for disposal.

FIG. 11 illustrates one step in the removal of a segmental valve keeper 13 from the top end of a valve stem 17. The bottom end rim of the piston cylinder 25 of the hand-held device 1 is shown pushing down on a spring retainer 15 and depressing the valve spring. This frees the segmental keeper 13, and allows the keeper segments to be drawn up to a magnet 29 inside the end of the piston cylinder 25 as shown in the illustration. FIG. 12 illustrates the second step, where the piston cylinder 15 has been withdrawn from the recessed valve, and two segments of the valve keeper 13 are attached inside the remove end of the piston cylinder 25, ready to be extracted and stored.

Figure 13:
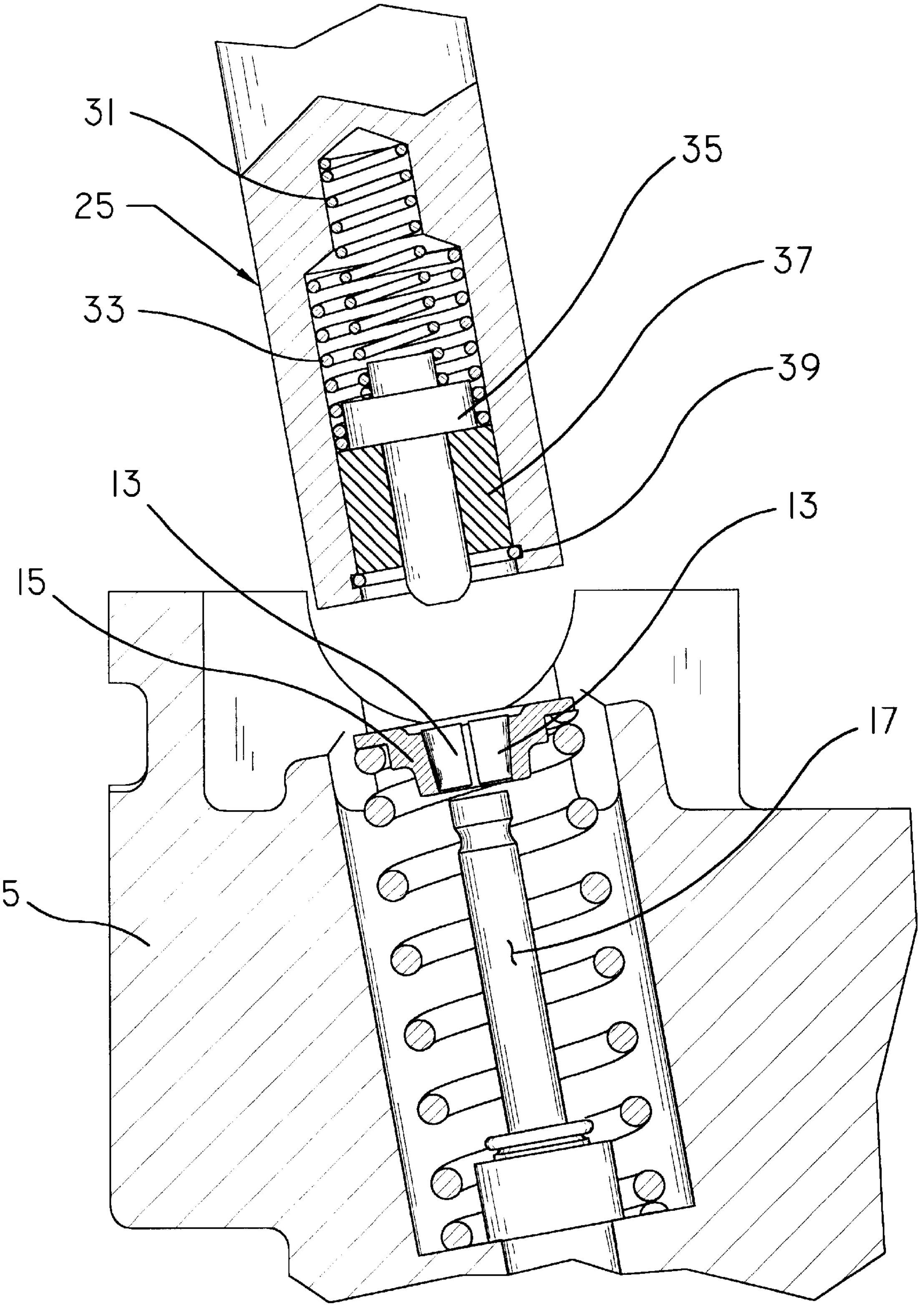
FIG. 13 is a partial cross-section view of the invention piston cylinder and an engine valve spring assembly, particularly showing the installation end of the piston cylinder ready for use, and a segmental valve keeper at the top of the valve stem spring, ready for installation.

For installation of a segmental valve keeper 13, the piston cylinder 25 ends are reversed and placed with the cylinder install end ready as shown in FIG. 13. First, a valve keeper 13 is manually placed in center of the spring retainer 15.

Figure 14:
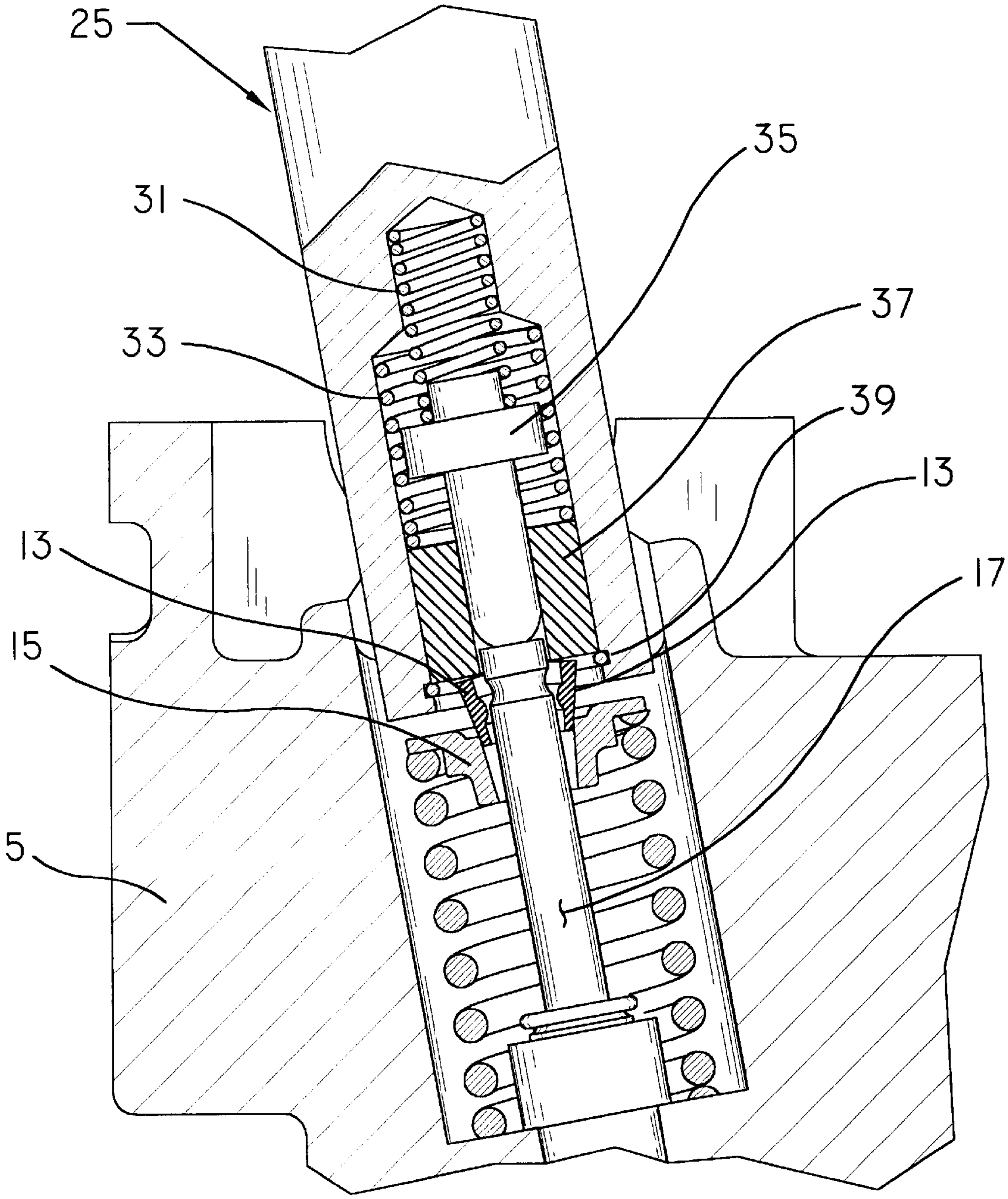
FIG. 14 is a partial cross-section view of the invention piston cylinder and an engine valve spring assembly, showing a segmental valve keeper being pushed in place on to a valve stem by the spring loaded components of the piston cylinder.

Next, as shown in FIG. 14, the piston cylinder 25 is pushed downwards by hand pressure, with its end bearing on top of the valve spring retainer 15. This act compresses the valve spring until the top of the spring retainer 15 is below the circular locking groove that is located near the top of the valve stem 17. At the same time, the action of the cylinder centering spring 31 on the top of the centering pin 35, causes the pin 35 to connect with the top of the valve stem 17, and locate the piston member 37 accurately above the segmental valve keeper 13, which is now pushed by the spring-loaded 33 piston member 37 into the retainer 15 with its segments seated firmly in the locking groove at the top of the valve stem 17. The valve keeper 13 is now locked squarely in position, eliminating any chance of damage to the lifter bore surface. Thus, as described above and demonstrated in practice, the invention tool system is easy to use even for relatively unskilled technicians, and will enable speedy removal and installation of segmental valve keepers on valve assemblies.

The tool system described above, although primarily intended for use with engines having four valves per cylinder can also be used effectively for engines having two valves per cylinder, which is the engine type for many past and present day automotive vehicles. For two valve per cylinder application, the stronger force valve springs may require the body material of the hand-held remove/install tool to be made of steel in order to withstand necessary hammer blows. Alternatively, a very hard, thick, aluminum material could also be used. In addition, the size and possibly the shape of the valve stem supports may need to be adjusted to support two larger valve stems rather than four small valve stems.

The removal and installation method using the invention tools is swift, relatively effortless and safe in operation. It is enormously economical in labor time and cost as compared with the use of prior art tools and methods, and is expected to be welcomed by the many automobile engine service shops. From the above description, it is clear that the preferred embodiment achieves the objects of the present invention. Alternative embodiments and various modifications may be apparent to those skilled in the art. These alternatives and modifications are considered to be within the spirit and scope of the present invention.

Having described the invention, what is claimed is:

1. A tool system for use in the removal and installation of segmental valve keepers in an internal combustion engine having cylinder heads with four valves per cylinder, each valve being recessed in an engine head and including a recessed valve spring; said tool system comprising:

(a) a hand-held keeper remove/install tool comprising an aluminum, elongated handle body and a piston cylinder; said handle body having a cylindrical shape and including a cylindrical axial cavity that is open at one end of said handle body, said handle body also including hand grip means; said piston cylinder comprising:

an aluminum, elongated cylindrical body member having one end for keeper removal use, designated the remove function end, and a distal end for keeper installation use, designated the install function end, said body member including a first axial bore in said remove function end that is cylindrical in shape and stepped to seat an annular magnet, and a second axial bore in said install function end; said body member having a diameter sized to fit snugly into said axial cavity in the end of said handle member;

an annular shaped magnet, said magnet being embedded in said first axial bore in said remove function end;

means for retaining said magnet in said first axial bore;

means for centering said install function end of said piston cylinder on a valve stem;

a steel, spring-loaded, tubular piston member which is fitted axially in said second axial bore; and means for retaining said piston member in said second axial bore;

said remove function end of said piston cylinder, when being pressed down on a valve spring retainer, compressing said valve spring and releasing said valve keeper; said magnet then drawing released keeper segments radially and outwardly off the top of said valve stem and holding said keeper segments free of said valve stem for removal by a user;

said install function end of said piston cylinder, when being pressed down on a segmental valve keeper placed for installation and on a valve spring retainer, compressing said valve spring and opening the top end of said valve stem; said piston member applying pressure to the segments of said valve keeper, causing said segments to engage a groove near the top of said valve stem, and then permitting said valve spring to extend upwards, causing said valve spring retainer to surround and grip said valve keeper, locking said valve spring retainer in place; and, (b) an engine head clamping device comprising:

a rigid, aluminum support base, having an elongated rectangular shape, a generally flat top portion and two opposing longitudinal sides; having open opposing ends and an open bottom; said top portion including a recessed inverted T-shaped channel with a top slit opening along its longitudinal axis; said longitudinal sides each including an inwardly projecting ledge along its length for slidingly holding a drawer;

a drawer, having an elongated rectangular shape and sized to fit slidingly in said support base under said top portion, said drawer being partitioned to provide separated storage for spare equipment parts, a tool, valve keepers and other valve parts;

two clamp post assemblies, each clamp post assembly comprising an L-shaped post and a padded clamp; said post comprising a rigid, metal upright strip, having flat sides and parallel straight edges, and a rigid flat-sided metal foot strip that is joined to the bottom of said upright strip with the flat plane of said foot strip projecting at 90 degrees to the vertical edges of said upright strip, the lower portion of said post being shaped and sized to fit slidingly in said top slit opening and said T-shaped channel in the top portion of said support base; said clamp incorporating a hand operated locking grip and being fastened slidingly to the upright strip portion of said post; and a multiplicity of valve stem supports, each valve stem support having a compressible surface for holding the bottoms of valve stems and including provision for mounting in said T-shaped channel on said support base, each valve stem support being mounted and fixed in position corresponding to the location of each set of four cylinder valves in system use, said engine head being first placed on the top of said support base so that each cylinder set of valve stems rests on a valve stem support; one said clamp post assembly then being pushed into each end of said support base, sliding in said recessed channel, and the padded clamps adjusted to bear down on the top ends of the engine head; said keeper remove/install tool then being held firmly by a user who inserts the piston cylinder portion of the tool in the bore of a valve for removal and installation of a valve keeper in a valve assembly; and during the entire operation, the engine head is secured in position and the valve stems for each cylinder are gently supported and prevented from movement by said engine head clamping device, avoiding possible damage to the valve stems or bores, and any loss of parts.

2. The tool system as defined in claim 1, wherein: said means for centering said install function end of said piston cylinder on a valve stem includes a spring-loaded steel centering pin that is fitted axially in said second axial bore, above said piston member and positioned to protrude through the center opening of said piston cylinder in order for the pin to bear on the top end surface of said valve stem.

3. The tool system as defined in claim 1, wherein: said valve stem supports, each comprise a hemi-sphere shaped, compressible pad which is made of a dense, elastic material, a metal disc member to which said pad is fastened, and a portion of T-section rail that is joined to the center bottom surface of said disc member, with the attached T-section rail inverted and projecting downwards; said attached T-section rail providing a means for attaching each valve stem support to said support base of said engine head clamping device.

4. A tool system for use in the removal and installation of segmental valve keepers in an internal combustion engine having cylinder heads with two valves per cylinder, each valve assembly having its valve spring exposed and above the engine head block ; said tool system comprising:

(a) a hand-held keeper remove/install tool comprising a steel, elongated handle body and a piston cylinder; said handle body having a cylindrical shape and including a cylindrical axial cavity that is open at one end of said handle body, said handle body also including hand grip means; said piston cylinder comprising:

a steel, elongated cylindrical body member having one end for keeper removal use, designated the remove function end, and a distal end for keeper installation use, designated the install function end, said body member including a first axial bore in said remove function end that is cylindrical in shape and stepped to seat an annular magnet, and a second axial bore in said install function end; said body member having a diameter sized to fit snugly into said axial cavity in the end of said handle member;

an annular shaped magnet, said magnet being embedded in said first axial bore in said remove function end;

means for retaining said magnet in said first axial bore;

means for centering said install function end of said piston cylinder on a valve stem;

a steel, spring-loaded, tubular piston member which is fitted axially in said second axial bore; and means for retaining said piston member in said second axial bore;

said removal end of said piston cylinder, when being pressed down on a valve spring retainer, compressing said valve spring and releasing said valve keeper; said magnet then drawing released keeper segments radially and outwardly off the top of said valve stem and holding said keeper segments free of said valve stem for removal by a user;

said install function end of said piston cylinder, when being pressed down on a segmental valve keeper placed for installation and on the valve spring retainer, compressing said valve spring and opening the top end of said valve stem; said piston member applying pressure to the segments of said valve keeper, causing said segments to engage a groove near the top of said valve stem, and then permitting said valve spring to extend upwards, causing said valve spring retainer to surround and grip said valve keeper, locking said valve spring retainer in place; and, (b) an engine head clamping device comprising:

a rigid, aluminum support base, having an elongated rectangular shape, a generally flat top portion and two opposing longitudinal sides; having open opposing ends and an open bottom; said top portion including a recessed inverted T-shaped channel with a top slit opening along its longitudinal axis; said longitudinal sides each including an inwardly projecting ledge along its length for slidingly holding a drawer;

a drawer, having an elongated rectangular shape and sized to fit slidingly in said support base under said top portion, said drawer being partitioned to provide separated storage for spare equipment parts, valve keepers and other valve parts;

two clamp post assemblies, each clamp post assembly comprising an L-shaped post and a padded clamp; said post comprising a rigid, metal upright strip, having flat sides and parallel straight edges, and a rigid flat-sided metal foot strip that is joined to the bottom of said upright strip with the flat plane of said foot strip projecting at 90 degrees to the vertical edges of said upright strip, the lower portion of said post being shaped and sized to fit slidingly in said top slit opening and said T-shaped channel in the top portion of said support base; said clamp incorporating a hand operated locking grip and being fastened slidingly to the upright strip 10 portion of said post; and a multiplicity of valve stem supports, each valve stem support having a compressible surface for holding the bottoms of valve stems and including provision for mounting in said T-shaped channel on said support base, each valve stem support being mounted and fixed in position corresponding to the location of each set of two cylinder valves ;

in system use, said engine head being first placed on the top of said support base so that each cylinder set of valve stems rests on a valve stem support; one said clamp post assembly then being pushed into each end of said support base, sliding in said recessed channel, and the padded clamps adjusted to bear down on the top ends of the engine head; said keeper remove/install tool then being held firmly by a user who pushes the piston cylinder portion of the tool down on a valve retainer to compress the valve spring for removal and installation of a valve keeper in a valve assembly; and during the entire operation, the engine head is secured in position and the valve stems for each cylinder are gently supported and prevented from movement by said engine head clamping device, avoiding possible damage to the valve stems and any loss of parts.

5. The tool system as defined in claim 4, wherein: said means for centering said install function end of said piston cylinder on a valve stem includes a spring-loaded steel centering pin that is fitted axially in said second axial bore, above said piston member and positioned to protrude through the center opening of said piston cylinder in order for the pin to bear on the top end surface of said valve stem.

6. The tool system as defined in claim 4, wherein: said valve stem supports, each comprise a hemi-sphere shaped, compressible pad which is made of a dense, elastic material, a metal disc member to which said pad is fastened, and a portion of T-section rail that is joined to the center bottom surface of said disc member, with the attached T-section rail inverted and projecting downwards; said attached T-section rail providing a means for attaching each valve stem support to said support base of said engine head clamping device.

7. The tool system as defined in claim 4, wherein: said handle body and said cylindrical body member of said piston cylinder are made of hard aluminum.

* * * * *